(12) United States Patent
Marshall

(10) Patent No.: US 6,387,316 B1
(45) Date of Patent: May 14, 2002

(54) METHOD OF CASTING A THERMOSET LAYER ON A GOLF BALL PRECURSOR PRODUCT

(75) Inventor: Gary G. Marshall, Soddy Daisy, TN (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 09/495,588

(22) Filed: Feb. 1, 2000

(51) Int. Cl.[7] .............................................. B29C 39/10
(52) U.S. Cl. ........................ 264/511; 264/248; 264/251; 264/254; 264/279.1; 264/275
(58) Field of Search ................................. 264/510, 248, 264/251, 254, 279.1, 275, 511

(56) References Cited

U.S. PATENT DOCUMENTS

| | | |
|---|---|---|
| 721,462 A | 2/1903 | Richards |
| 2,940,128 A | 6/1960 | Howerman et al. |
| 3,034,791 A | 5/1962 | Gallagher |
| 3,068,522 A | 12/1962 | Nickerson et al. |
| 3,112,521 A | 12/1963 | Ward |
| 3,130,102 A | 4/1964 | Watson et al. |
| 3,147,324 A | 9/1964 | Ward |
| 3,177,280 A | 4/1965 | Ford et al. |
| 3,616,101 A | 10/1971 | Satchell et al. |
| 3,979,126 A | 9/1976 | Dusbiber |
| 3,989,568 A | 11/1976 | Isaac |
| 4,123,061 A | 10/1978 | Dusbiber |
| 4,203,941 A | 5/1980 | Brooker |
| 4,959,000 A | 9/1990 | Giza |
| 5,006,288 A | 4/1991 | Rhodes, Jr. et al. |
| 5,006,297 A | 4/1991 | Brown et al. |
| 5,112,556 A | 5/1992 | Miller |
| 5,194,191 A | 3/1993 | Nomura et al. |
| 5,334,673 A | 8/1994 | Wu |
| 5,484,870 A | 1/1996 | Wu |
| 5,692,974 A | 12/1997 | Wu et al. |
| 5,703,193 A | 12/1997 | Rosenberg et al. |
| 5,733,428 A | 3/1998 | Calabria et al. |
| 5,885,172 A | 3/1999 | Hebert et al. |
| 5,888,437 A | 3/1999 | Calabria et al. |
| 5,897,884 A | 4/1999 | Calabria et al. |
| 5,908,358 A | 6/1999 | Wu |
| 5,947,843 A | 9/1999 | Calabria et al. |

FOREIGN PATENT DOCUMENTS

WO    WO 99/43394    2/1999

Primary Examiner—Jan H. Silbaugh
Assistant Examiner—Edmund H. Lee
(74) Attorney, Agent, or Firm—Michael A. Catania

(57) ABSTRACT

A method and system for inserting a golf ball precursor product into a cavity of a mold half for precision centering is disclosed herein. The precision centering allows for the concentricity of core in relation to the cover of a golf ball. The system includes an insertion mechanism that allows for the vertical movement of a plurality of vacuum cups along a longitudinal pathway. The vacuum cups retain the golf ball precursor products and insert each into a corresponding cavity on a mold half. As the vacuum cups are lowered along the longitudinal pathway, the mold half is elevated along the longitudinal pathway. The mold half and vacuum cups meet at an insertion position where the golf ball precursor products are released from the vacuum cups and set within a thermoset material contained in each of the cavities.

8 Claims, 14 Drawing Sheets

METHOD OF CASTING A THERMOSET LAYER ON A GOLF BALL PRECURSOR PRODUCT

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to an apparatus and method for inserting a golf ball precursor product into a thermoset polymer mixture for forming a casting a layer on the golf ball precursor product. More specifically, the present invention relates to an apparatus and method for inserting a core with a boundary layer thereon into a mixture of thermoset polyurethane for casting a thermoset polyurethane cover on the golf ball core and boundary layer.

2. Description of the Related Art

Golf balls may comprise one-piece constructions or they may include several layers including a core, one or more intermediate layers and an outer cover that surrounds any intermediate layer and the core. In multi-component golf balls, there exists an inner core. Often, this core is made by winding a band of elastomeric material about a spherical elastomeric or liquid-filled center. Alternatively, the core may be a unitary spherical core made of a suitable solid elastomeric material. One such material that is conventionally used for the core of golf balls is a base rubber, such as polybutadiene, which is cross-linked with a metal acrylate, such as zinc diacrylate.

In the construction of some multi-component golf balls, an intermediate boundary layer is provided outside and surrounding the core. This intermediate boundary layer is thus disposed between the core and the outer cover of the golf ball.

Located outwardly of the core and any intermediate boundary layer is a cover. The cover is typically made from any number of thermoplastic or thermosetting materials, including thermoplastic resins such as ionomeric, polyester, polyetherester or polyetheramide resins; thermoplastic or thermoset polyurethanes; natural or synthetic rubbers such as balata (natural or synthetic) or polybutadiene; or some combination of the above.

Golf balls are typically manufactured by various molding processes, whether one-component or multicomponent balls. Generally, the core of the golf ball is formed by casting, compression molding, injection molding or the like. If an intermediate boundary layer is desired, one or more intermediate boundary layers are added over the core by any number of molding operations, including casting, compression molding, and/or injection molding. The cover is then formed over the core and intermediate boundary layers, if present, through casting, compression molding, and/or injection molding.

One example of a conventional golf ball manufacturing process is described in U.S. Pat. No. 3,068,522, issued on Dec. 18, 1962 ("the '522 patent"). The manufacturing process disclosed in the '522 patent uses a molding press having upper and lower die portions that surround a golf ball core. A retractable seat contacts the golf ball core to place the same in the desired orientation within the die cavity. The cover material is then injected into the die cavity to form the cover of the ball. The '522 patent further discloses that the timing of the retraction of the retractable seat is critical and depends, in part, on the flow rate of the cover material into the mold cavity. In order to prevent the retardation of the flow rate or pre-hardening of the injected coating material, the '522 patent teaches that in some instances, it may be necessary to heat the molding dies and pre-heat the golf ball core to a temperature slightly above ambient temperature.

Another example, U.S. Pat. No. 5,194,191 ("the '191 patent"), issued Mar. 16, 1993 discloses a method of preparing thread-wound golf balls. In the '191 patent, a rubber thread or material is wound around a frozen core of material to form a core. Immediately thereafter, the core undergoes microwave heating to rapidly thaw the frozen core without heating the rubber thread layer and without moisture condensation taking place on the surface of the core. The method of the '191 patent allegedly reduces the core thawing time and eliminates the need for a drying step.

These and other current golf ball manufacturing processes continue to suffer from a number of disadvantages. For example, when the outer cover of the golf ball is made from a thermoset material, e.g., thermoset polyurethane, the core and any intermediate boundary layer(s) tend to undergo thermal expansion during the casting of the outer cover, as heat is generated by the exothermic reaction of the thermoset processes used in the formation of the cover. As the cover forms, and before the cover develops sufficient green strength, the thermal expansion of the core and any intermediate boundary layer, in turn, may cause the outer cover of the golf ball to fracture or crack. Although this problem is particularly relevant to covers that are formed of thermoset polyurethane, it is not believed to be limited thereto. Similar problems may arise with other materials and processes.

Cracking is not the only problem with the current conventional methods of manufacturing golf balls. Since a temperature gradient exists between the core, intermediate layer, if any, and the outer cover, the central portion of the ball acts as a heat sink that absorbs heat given off during the cover-making process. In this regard, the reaction that takes place to cure the outer cover takes longer given the cooler temperature in the inner core of the ball. Production cycle times are thus adversely increased.

Consequently, there remains a need for methods of manufacturing golf balls that do not suffer from the above disadvantages. Moreover, a system and method that permits precision centering of a core in relation to a cover is greatly desired.

BRIEF SUMMARY OF THE INVENTION

The present invention provides a method and system for inserting a golf ball precursor product, such as a core with a boundary layer, into a cavity containing a predetermined quantity of thermoset material in an uncured state. The present invention allows for a plurality of golf ball precursor products to be centered within a plurality of cavities containing the thermoset material.

One aspect of the present invention is a method for casting a thermoset layer on each of a plurality of golf ball precursor products. The method includes introducing a flowable material into each of a plurality of cavities disposed on a first mold half, and a second mold half. The flowable material is a thermoset polymer material, precursor thermoset polymer materials, or a mixture thereof. Next, each of the plurality of golf ball precursor products are suctioned from a holding platen using a vacuum cup for each. The holding platen is movable from a hopper position to a suctioning position along a horizontal plane. Each vacuum cup is connected to the locating plate. Next, the first mold half is lifted along a longitudinal pathway from a conveyor position to an insert position. The locating plate is also disposed along the longitudinal pathway. Next, the locating plate with each of the plurality of golf ball precursor products retained in corresponding vacuum cups is lowered toward the first mold half at the insert position. Next, each of the plurality of golf ball precursor products is inserted into a corresponding cavity of the plurality of cavities of the first mold half at the insert position. Next, each of the plurality of golf ball precursor products is released from each of the vacuum cups subsequent to the flowable material gelling to a sufficient viscosity. Next, the first mold half with the plurality of golf ball precursor products therein is lowered to the conveyor position. Then, the first mold half is transferred to a mold assembly station for mating with the second mold half to form a mold assembly to enclose each of the plurality of golf ball precursor products within a spherical cavity to form a thermoset layer on each of the plurality of golf ball precursor products.

The method also includes heating the mold assembly to cure the thermoset layer on each of the golf ball precursor products. The method also includes gelling the thermoset material in each of the plurality of cavities of the first mold half for a period of 10 to 60 seconds prior to inserting each of the golf ball precursor products into each of the plurality of cavities of the first mold half.

The plurality of golf ball precursor products suctioned from the holding platen may be ten, and the plurality of cavities of the first mold half would also be ten. The method may also include elevating each of the golf ball precursor products above the holding platen through flowing of air into each of a plurality of platen cavities that hold each of the golf ball precursor products. The flowable material is preferably a thermoset polyurethane material and precursors therefor, and most preferably a para-phenylene diisocyanate-based polyurethane material.

Another aspect of the present invention is a system for casting a thermoset layer on a golf ball precursor product. The system includes a first mold half, a platen, a locating plate, a lifter, a spacer plate and a source of golf ball precursor products. The platen receives the golf ball precursor products from the source in a predetermined pattern. The locating plate has a plurality of vacuum cups for suctioning a corresponding golf ball precursor product from the platen. The locating plate is also movable along a longitudinal pathway from at least a platen position, an upper limit position and an insertion position. The spacer plate is disposed along the longitudinal pathway and has an aperture for placement of each of the vacuuming cups, with a golf ball precursor product, therethrough. The lifter lifts the first mold half along the longitudinal pathway to the spacer plate for receiving of each of the plurality of golf ball precursor products in a corresponding cavity of the plurality of cavities.

The system may also include means for moving each of plurality of vacuum cups from an insertion position to a retraction position. The system may also include a servomotor for controlling the vertical movement of the locating plate along the longitudinal pathway. The system may also include means for lifting each of the plurality of golf ball precursor products from corresponding cavities of the platen using a pressurized gas.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
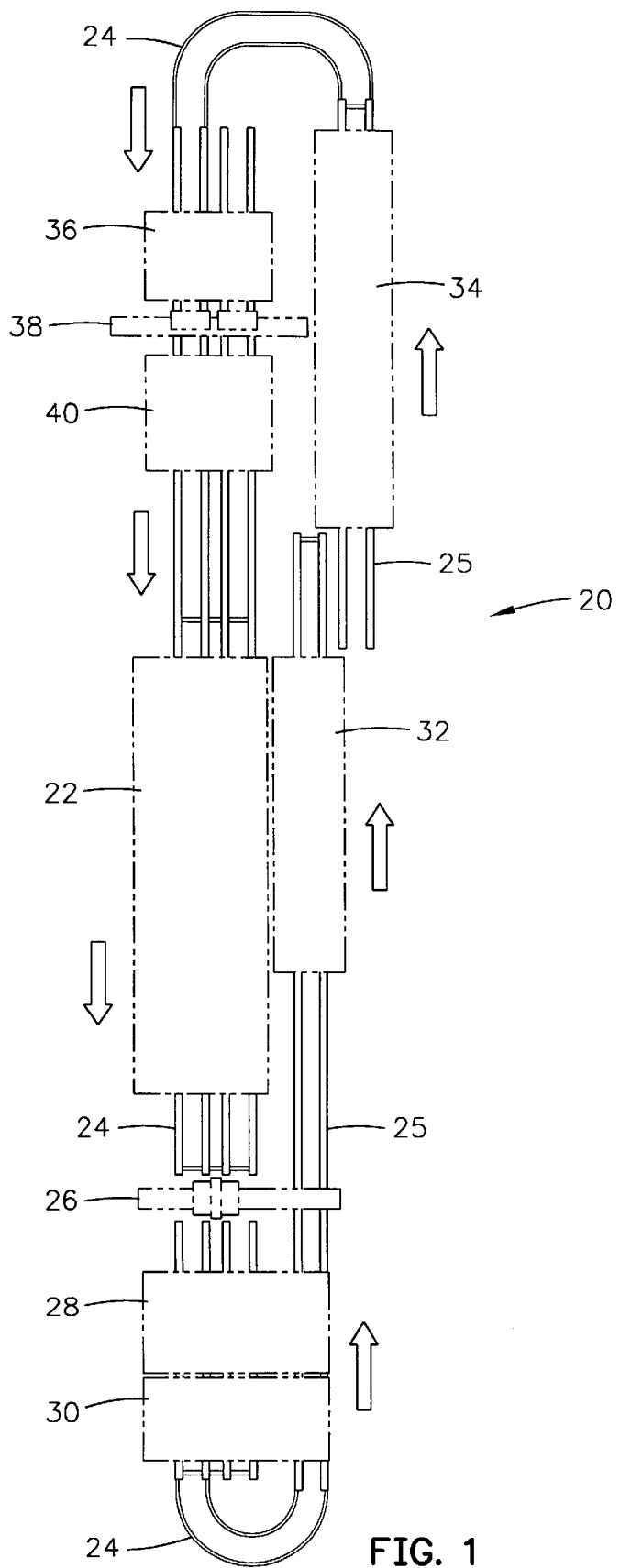
FIG. 1 is a schematic view of a casting system.

The cast molding insertion apparatus and method of the present invention is preferably utilized as a component of a casting system. A preferred casting system 20 is shown in FIG. 1. The cycle of the system begins with mold halves preheated to a predetermined temperature in a preheating oven 22. From there, the mold halves are transported on a conveyor 24 to a dispensing station 26 where each cavity of each mold half, is filled with a flowable thermoset material, preferably a thermoset polyurethane. The mixture is allowed to gel, or partially cure, then a golf ball precursor product is inserted in each of the mold cavities of one mold half at a core insertion station 28, which will be described below in greater detail. During this time, the cavities of a second mold half have received a predetermined quantity of the flowable thermoset material. The first mold half is then transferred to a mold assembly station 30 to be inverted and mated with the second mold half to form a mold assembly with each mold cavity of the first mold half aligning with a corresponding mold cavity of the second mold half. The mold assembly is then transferred on the conveyor 24 to a curing oven 32 and then to a cooling oven 34. Next, the mold assembly is transferred to a disassembly station 36 for separating the mold halves. The first mold half is placed on a second conveyor line 25 and the second mold half is placed on the first conveyor line 24. Then, the golf balls are removed from the second mold half at a removal station 38. The mold halves are cleaned and inspected at an inspection station 40, then the process is repeated.

Figure 2:
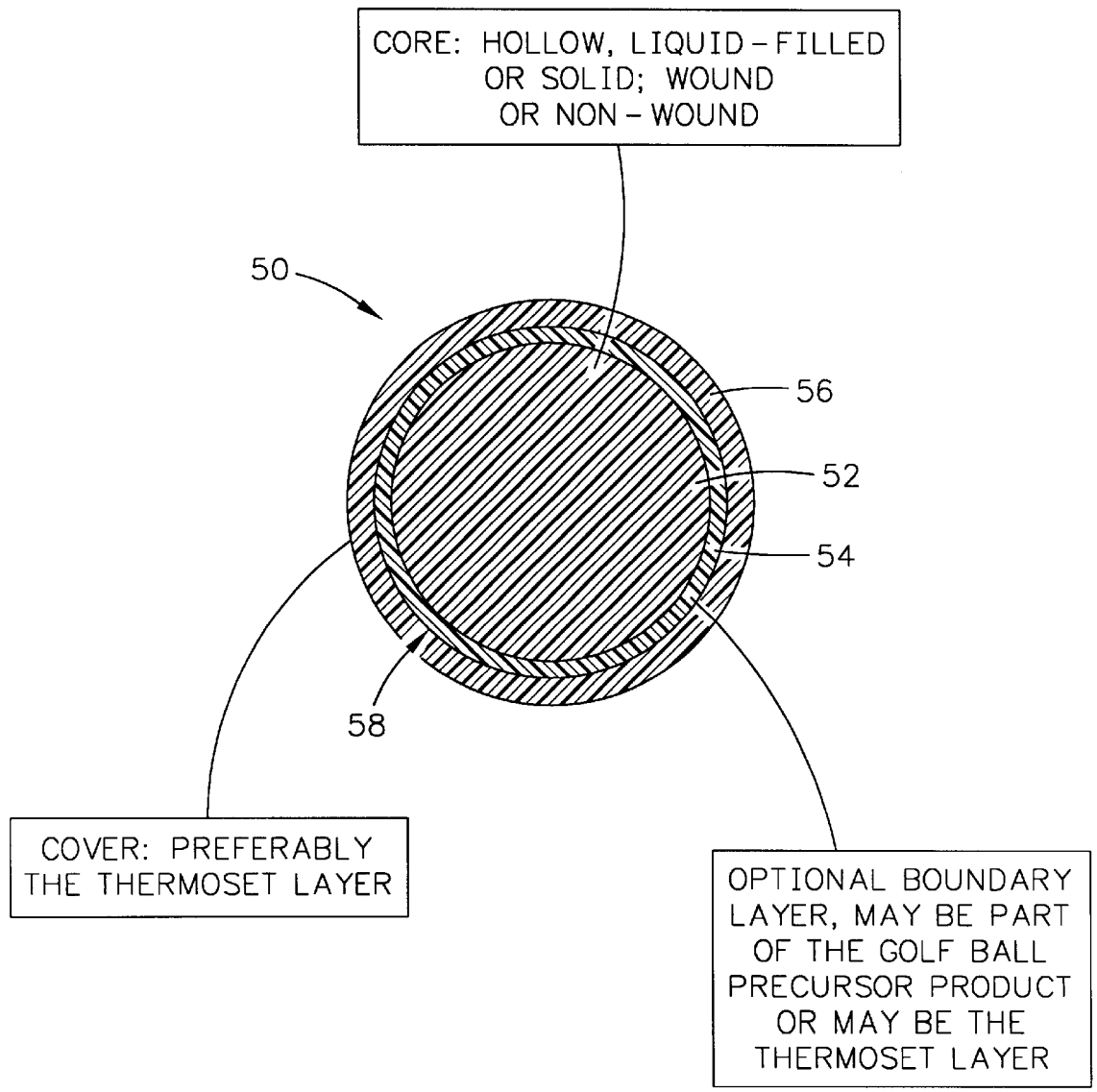
FIG. 2 is a cross-sectional view of a golf ball manufactured using the present invention.

As shown in FIG. 2, a golf ball 50 has a core 52, an optional boundary layer 54 and a cover 56. The golf ball precursor products 58 may be the core 52 alone (solid, liquid or hollow, and wound or non-wound). However, preferably the golf ball precursor product 58 is the core 52 with one or more intermediate or boundary layers 54 over the core portion. The cover 56 is preferably the thermoset material layer that is casted using the casting process mentioned above. However, the boundary layer 54 may be the thermoset layer, and a cover may be formed over it. A preferred thermoset material is a thermoset polyurethane such as described in U.S. Pat. No. 6,117,024, entitled Polyurethane. Cover For A Golf Ball, which pertinent parts are hereby incorporated by reference. However, those skilled in tie relevant art will recognize that other thermoset materials may be used win the present invention without departing from the scope and spirit of the present invention.

Figure 3:
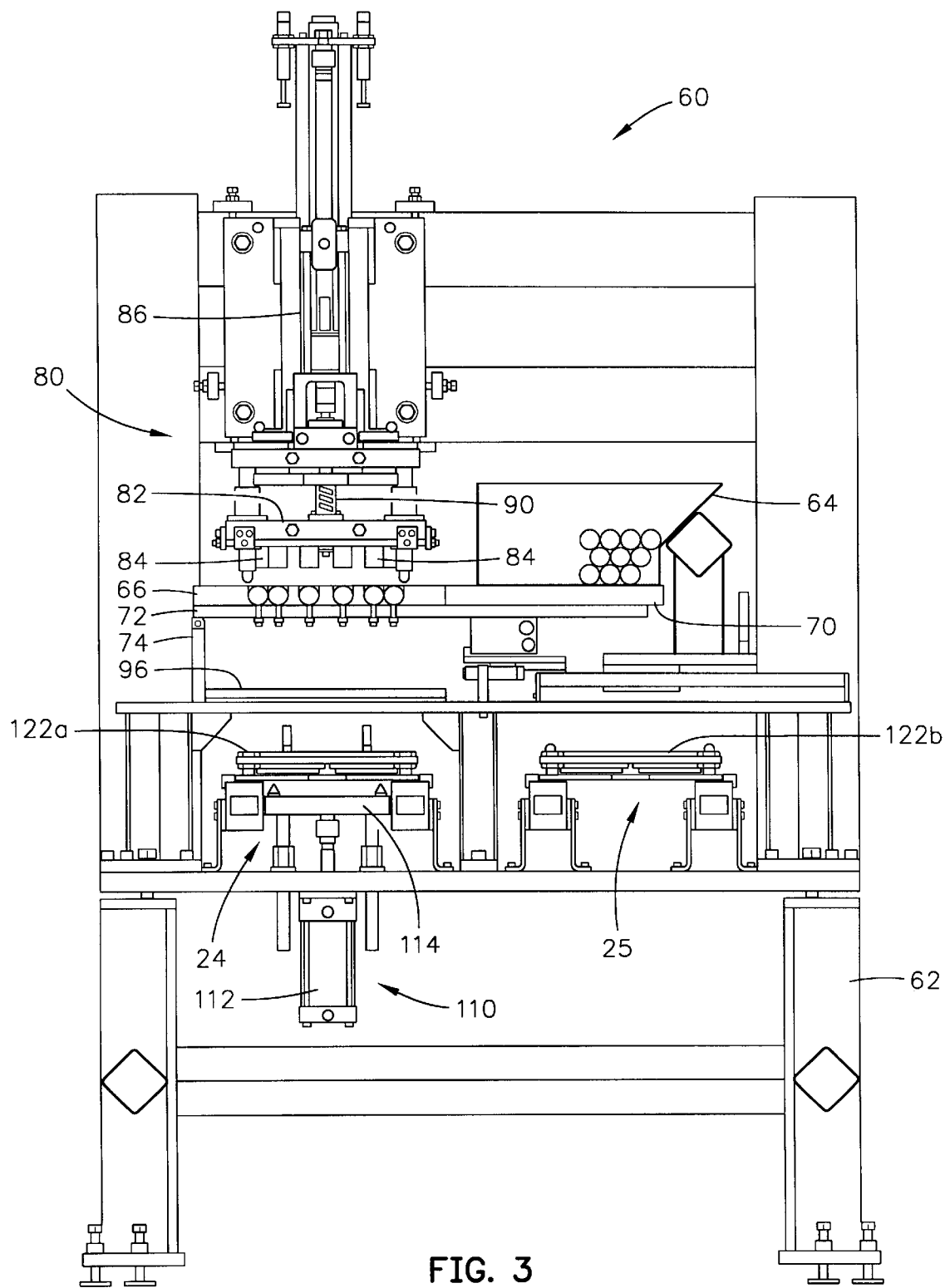
FIG. 3 is a front view of the insertion system of the present invention.
Figure 4:
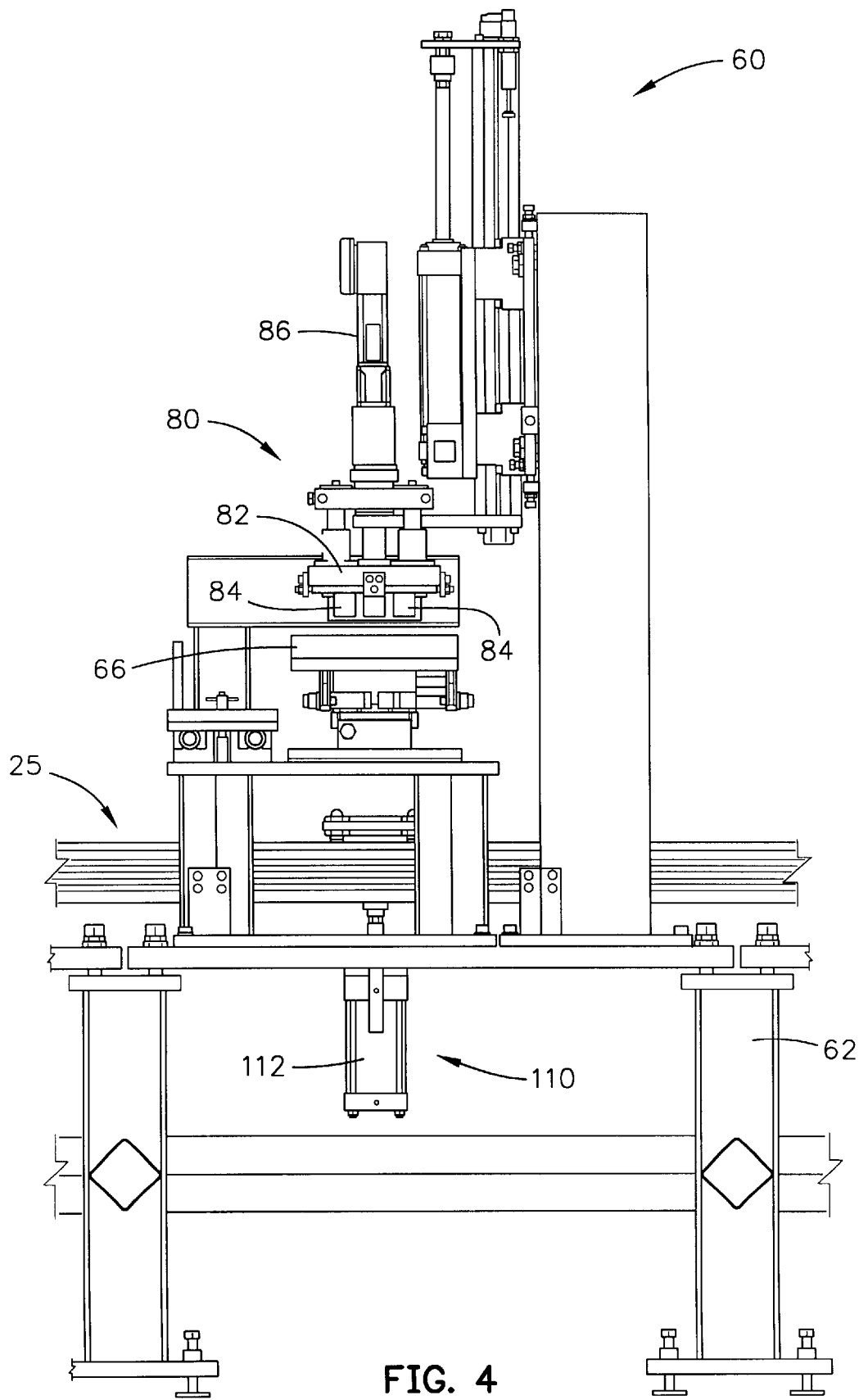
FIG. 4 is a side view of FIG. 3.
Figure 4A:
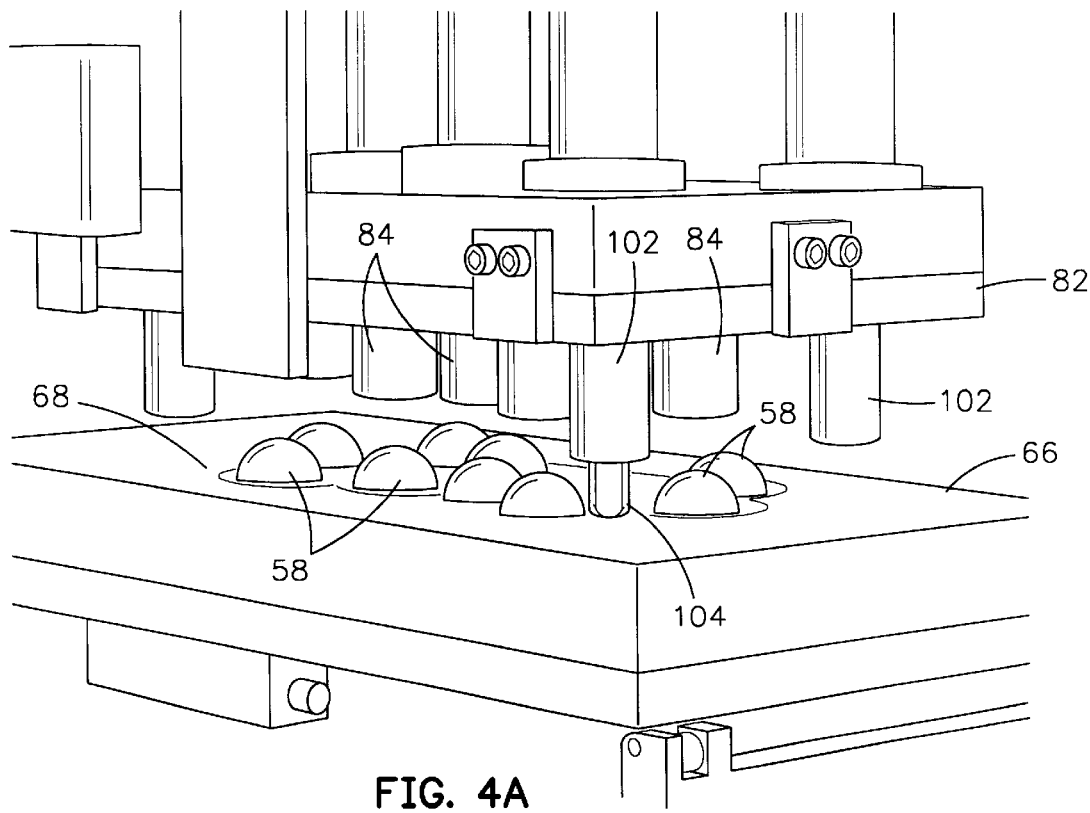
FIG. 4A is an isolated view of the platen at the removal position with golf ball precursor products therein and the vacuums cups thereabove.
Figure 4B:
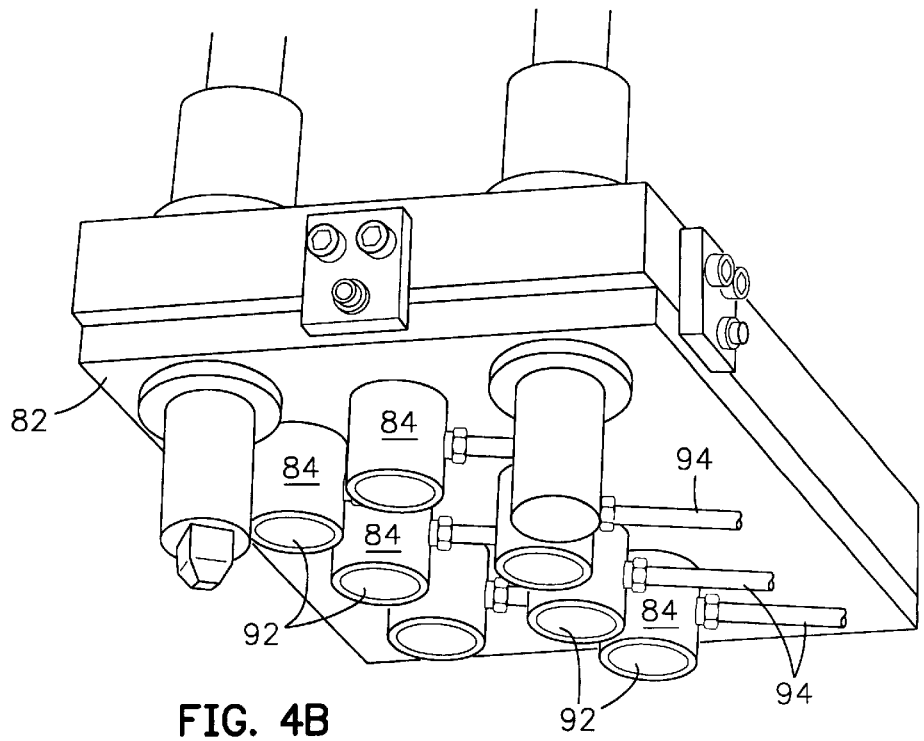
FIG. 4B is an isolated view of the locating plate and vacuum cups.

The insertion system 60 of the present invention is illustrated in FIGS. 3 and 4. The system 60 is mounted on a frame 62. The system 60 includes a source 64 of golf ball precursor products. The source 64 is preferably a hopper that receives golf ball precursor products that have been manufactured outside of the system 60. The source 64 delivers the golf ball precursor products in a predetermined pattern to a platen 66. As shown in FIG. 4B, the platen 66 has a plurality of recesses 68 that each receive a golf ball precursor product 58 therein. The platen 66 moves along a horizontal plane from a hopper position 70 to a removal position 72. The removal position 72 is along a longitudinal pathway 74. In this manner, golf ball precursor products are delivered from the source 64 to insertion mechanism 80.

The insertion mechanism 80 is disposed along the longitudinal pathway 74, and is operable along this pathway 74. The insertion mechanism 80 includes a locating plate 82 with a plurality of vacuum cups 84 connected thereto. The locating plate 82 has its movement controlled by a servo motor 86 disposed within the mechanism 80. The servo motor 86 allows the vertical movement of the locating plate 82 to be precisely controlled to effect precision centering of each of the golf ball precursor products 58 within a cavity containing a thermoset material. This precision centering allows for concentricity of the core 52 in relation to the cover 56, and possible boundary layer 54. A conventional computer processing unit ("CPU") 88, not shown, is programmed to control the activation and deactivation of the servo-motor 86. Thus, the servo-motor 86 can be programmed to operate for a set time period, then stop, to effect precision centering as further described below. This allows the present invention to center a golf ball precursor product 58 within a cavity without the need for a stop or other accessories for limiting the downward progression of the golf ball precursor products. In one preferred embodiment, the servo-motor 86 controls a threaded screw 90 which is threadingly connected to the locating plate 82.

Each of the vacuum cups 84 are themselves movable between an insertion position and a retraction position. The movement of the vacuum cups is preferably actuated by pneumatic cylinders. However, a series of servo-motors may also be used to actuated the movement of the vacuum cups 84. As shown in FIG. 4B, each vacuum cup 84 has a substantially hemispherical recess 92 therein for retaining a golf ball precursor product 58 therein. The recess 92 is in flow communication with a vacuum line 94 for exerting a vacuum on the golf ball precursor product 58 for suctioning thereof into the recess 92, and for retaining the golf ball precursor product 58 therein during the insertion step.

Figure 4C:
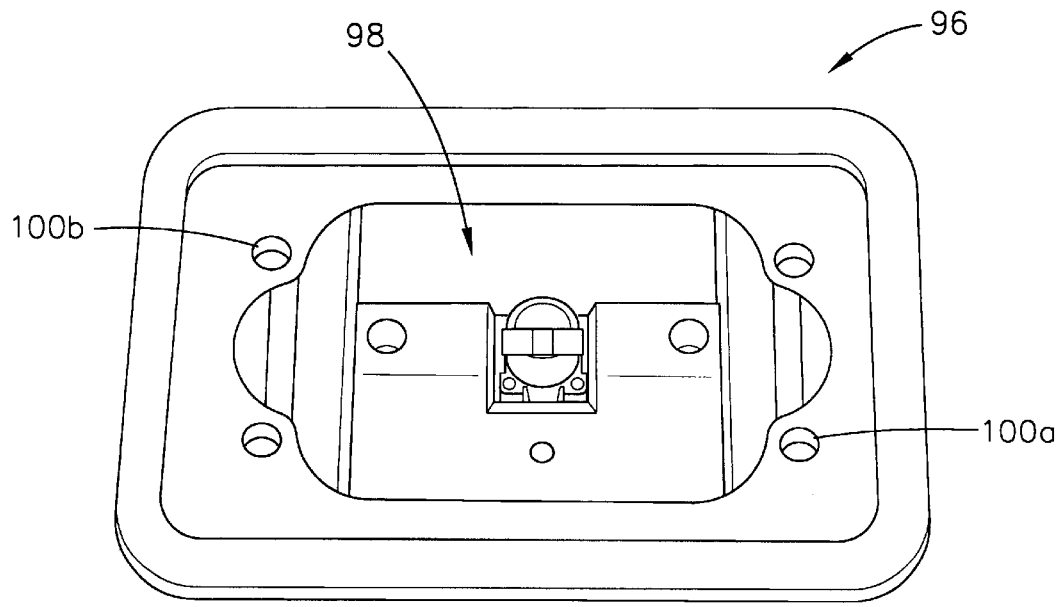
FIG. 4C is an isolated view of the spacer plate.
Figure 5:
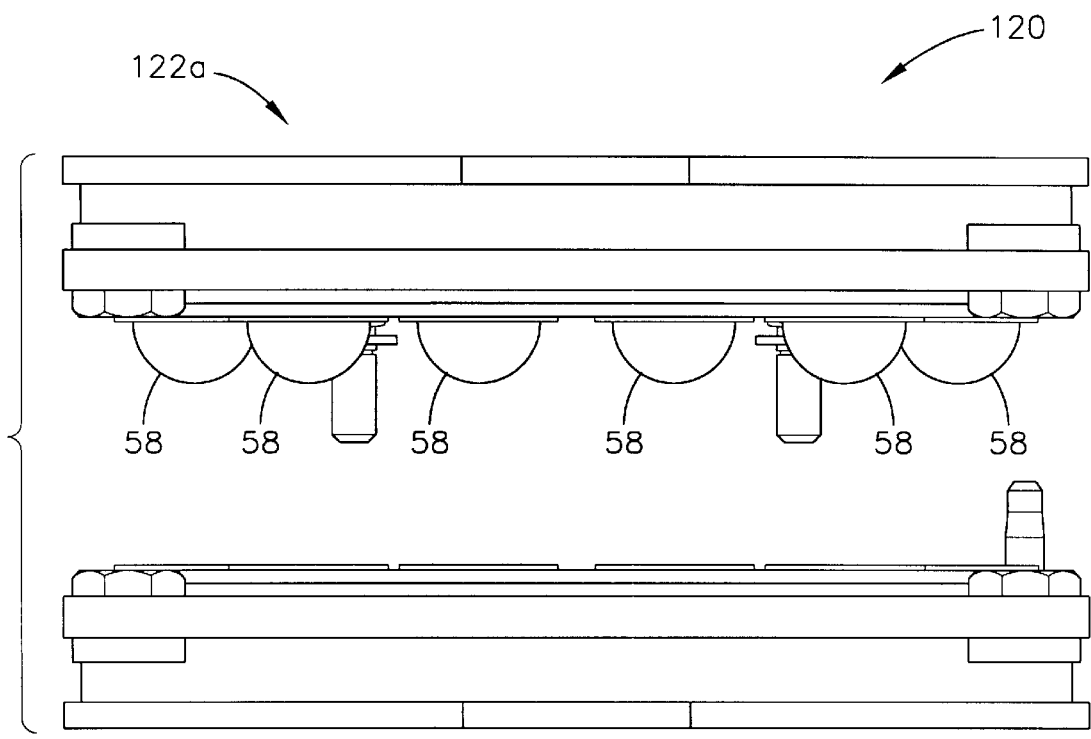
FIG. 5 is a side view of a mold assembly utilized with the present invention.

A spacer plate 96 is mounted on the frame 62 along the longitudinal pathway 74. The spacer plate 96 has a central aperture 98 therein for allowing the vacuum cups 84, with golf ball precursor products attached thereto, to engage the cavities with the thermoset material therein. As shown in FIG. 4C, the spacer plate 96 may also have a plurality of shaft apertures 100a–b for receiving positioning shafts 102 of the locating plate 82 therethrough during engagement with the locating plate 82. A point 104 of the shaft 102 will extend through the aperture 100 allowing for a secondary alignment mechanism.

Returning to FIGS. 3 and 4, a lifter mechanism 110 is disposed below the line of conveyance 24. The lifter mechanism 110 has a pneumatic cylinder 112 for lifting a lifter plate 114 along the longitudinal pathway 74. A first mold half 122a is disposed on the lifter plate 114 during its vertical movement. A set of hooks, or other conventional locking means, engage the first mold half 122a to restrain its lateral movement during vertical movement along the longitudinal pathway 74.

The first mold half 122a has a plurality of mold cavities 132 that each have previously received a predetermined quantity of the thermoset flowable material from a dispenser at the dispensing station 26. The first mold half 122a is transferred from the dispensing station 26 to the insertion station 28 by the conveyor 24. A retractable limiting member is preferably utilized to limit movement of the first mold half at the insertion station 28. The lifter mechanism 74 then lifts the first mold half 122a to an insertion position at the spacer plate 92. The lifter is set to elevate the first mold half 122a to a position for receiving each of the golf ball precursor products 58 into corresponding cavities 132.

As shown in FIGS. 5–9, a mold assembly for casting a layer of a thermoset material on a golf ball precursor product is generally designated 120, and is composed of the first mold half 122a and a second mold half 122b. In a preferred embodiment, the first mold half 122a is the top mold half and the second mold half 122b is the bottom mold half. A preferred mold assembly 120 is described in co-pending U.S. patent application Ser. No. 09/495,583, filed on Feb. 1, 2000, entitled Golf Ball Casting Mold Assembly, which is hereby incorporated in its entirety by reference. However, those skilled in the pertinent art will recognize tat other mold assemblies may be utilized with the present invention without departing from the scope and spirit of the present invention.

Each mold half 122a–b is generally composed of a carrier base 124, a carrier plate 126 and a retainer plate 128. Each mold half 122a–b also has a plurality of mold inserts 130 positioned within mold insert apertures 131 of the retainer plate 128 and mold insert apertures 133 of the carrier plate 126. The carrier plate 126 is sandwiched between the carrier base 124 and the retainer plate 128. The carrier plate 126 carries the mold inserts 130 during the casting process. The retainer plate 128 is designed to lock each of the mold inserts 130 in the carrier plate 126. The carrier base 124 is the mold assembly's 120 contact surface during conveyance through a casting system.

Figure 10:
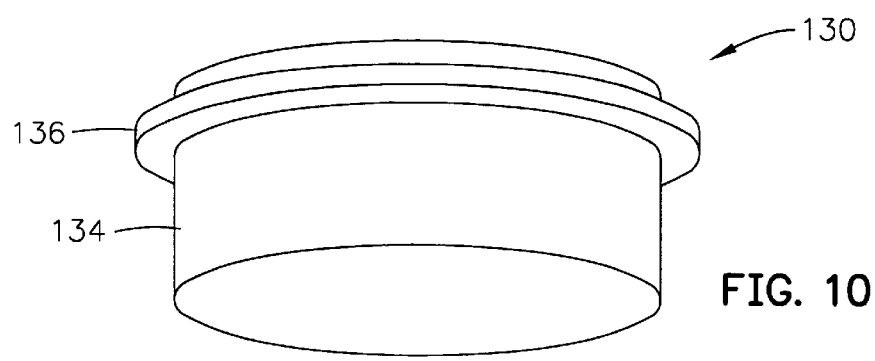
FIG. 10 is a plan view of a mold insert placed within a mold half of the mold assembly of FIG. 5.
Figure 11:
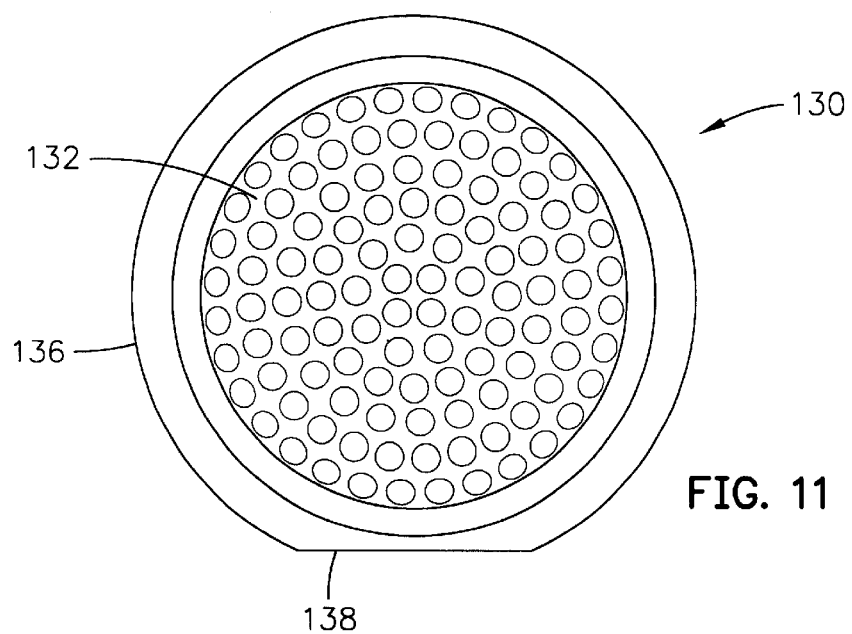
FIG. 11 is a top plan view of the mold insert of FIG. 10 illustrating the inverse dimple pattern for creating a thermoset cover with a dimple pattern thereon.
Figure 12:
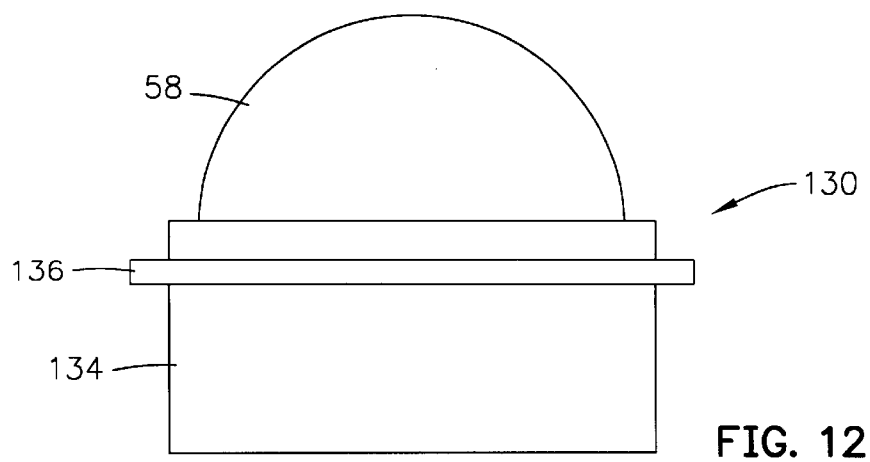
FIG. 12 is a side view of the mold insert of FIG. 10 with a golf ball precursor product therein.

FIGS. 10–12 illustrate preferred mold inserts 130 that are used with the mold assembly 120. Each mold insert 130 has a hemispherical cavity 132 within a body 134. Around a center height of the body 134 is an annular flange 136 that has an alignment flat 138 along a portion thereof. The flange 136 is used for mounting each mold insert 130 on the carrier plate 126.

Figure 6:
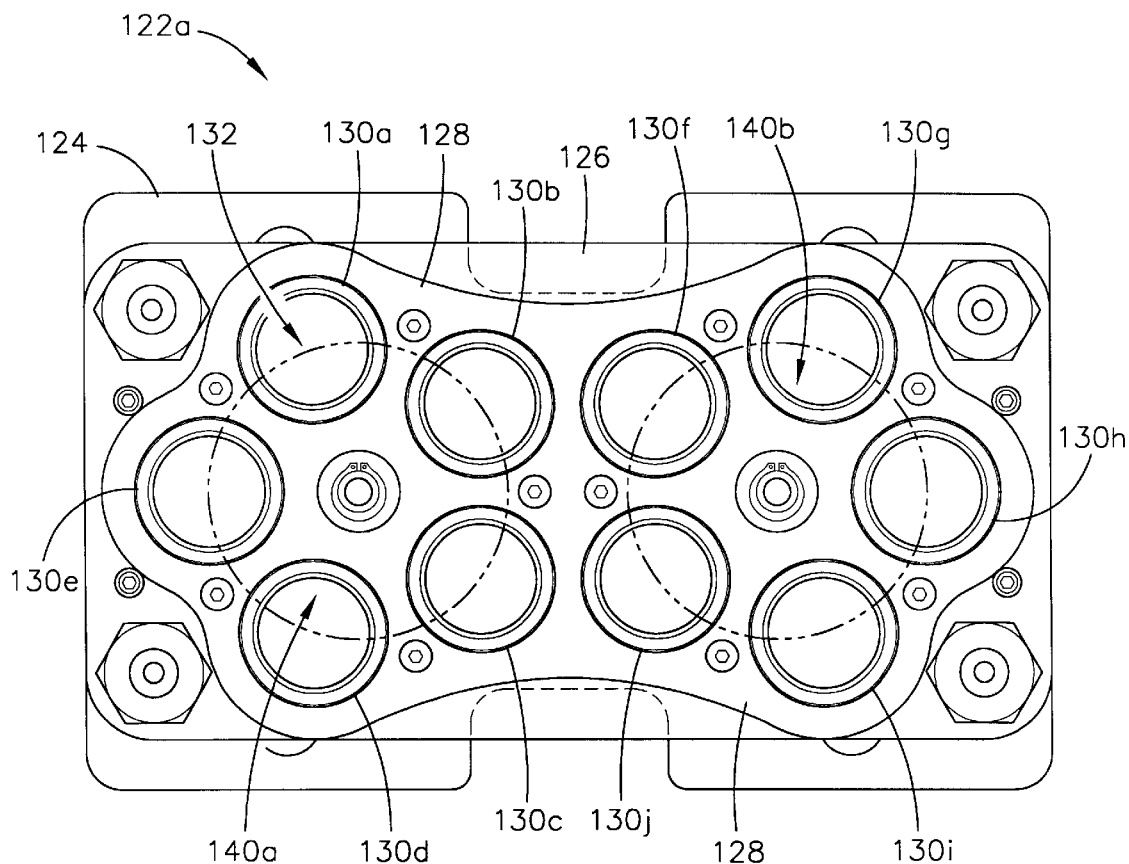
FIG. 6 is a top plan view of top mold half of the mold assembly of FIG. 5.
Figure 7:
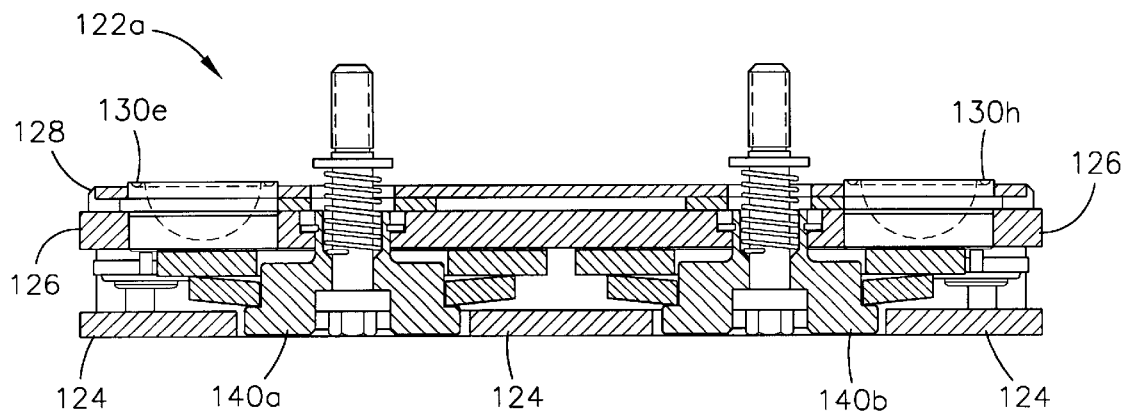
FIG. 7 is a cross-sectional view of the top mold half of FIG. 6.
Figure 8:
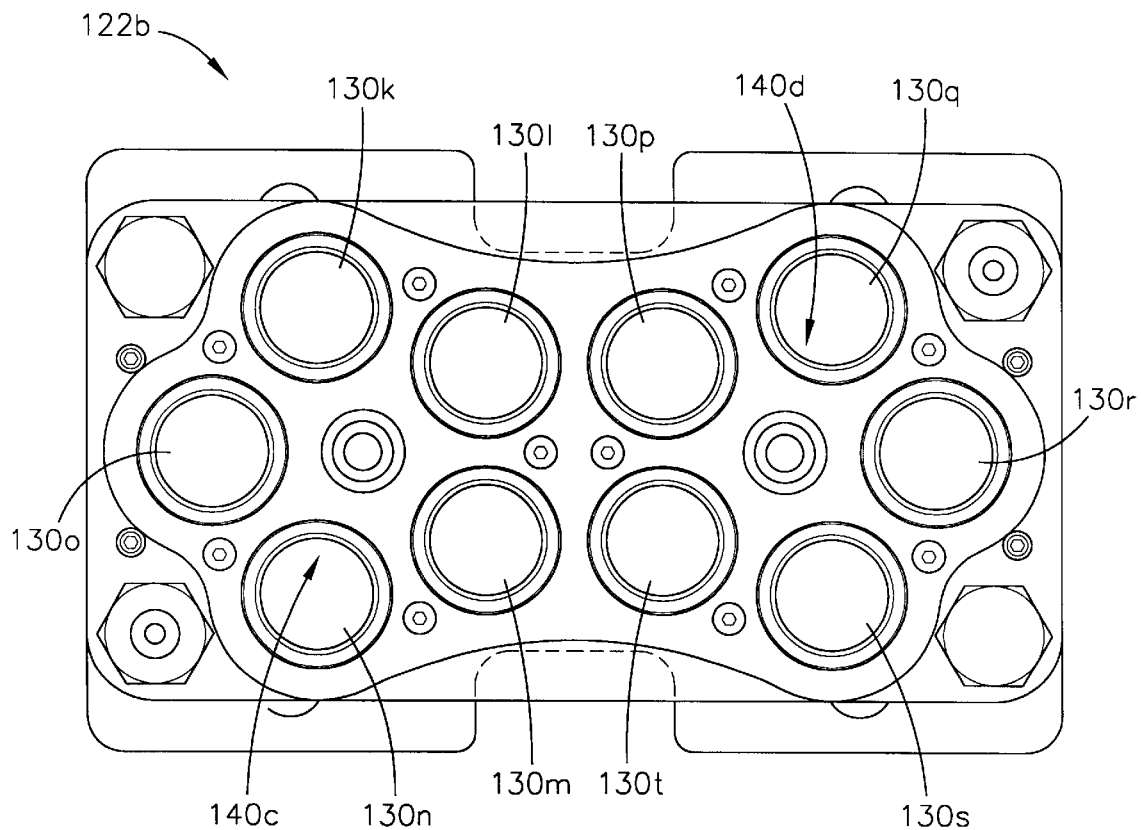
FIG. 8 is a top plan view of a bottom mold half of the mold assembly of FIG. 5.
Figure 9:
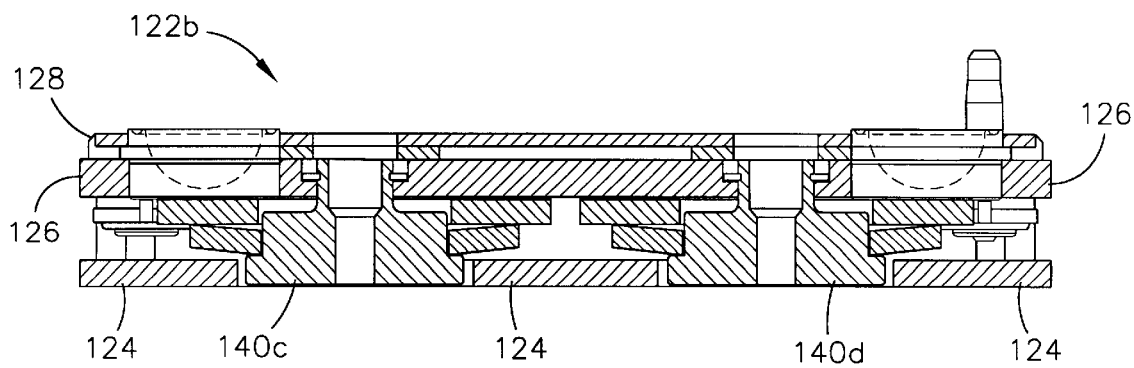
FIG. 9 is a cross-sectional view of the bottom mold half of FIG. 6.

The hemispherical cavity 132 preferably has an inverse dimple pattern thereon if a cover 56 is formed in the mold insert 130. However, the hemispherical cavity 132 will have a smooth surface if a boundary layer 54 is formed in the mold insert 130. The number of mold inserts 130 used for each mold half 122a–b may preferably range from eight to twelve, and is most preferably ten. In the preferred embodiment, as shown in FIGS. 6 and 8, five mold inserts 130a–e are positioned about hub mechanism 140a, five mold inserts 130f–j are positioned about hub mechanism 140b, five mold inserts 130k–o are positioned about hub mechanism 140c, and five mold inserts 130p–t are positioned about hub mechanism 140d. Those skilled in the art will recognize that more or less than five inserts may be positioned about each hub mechanism 140a–d without departing from the scope and spirit of the present invention.

Figure 13:
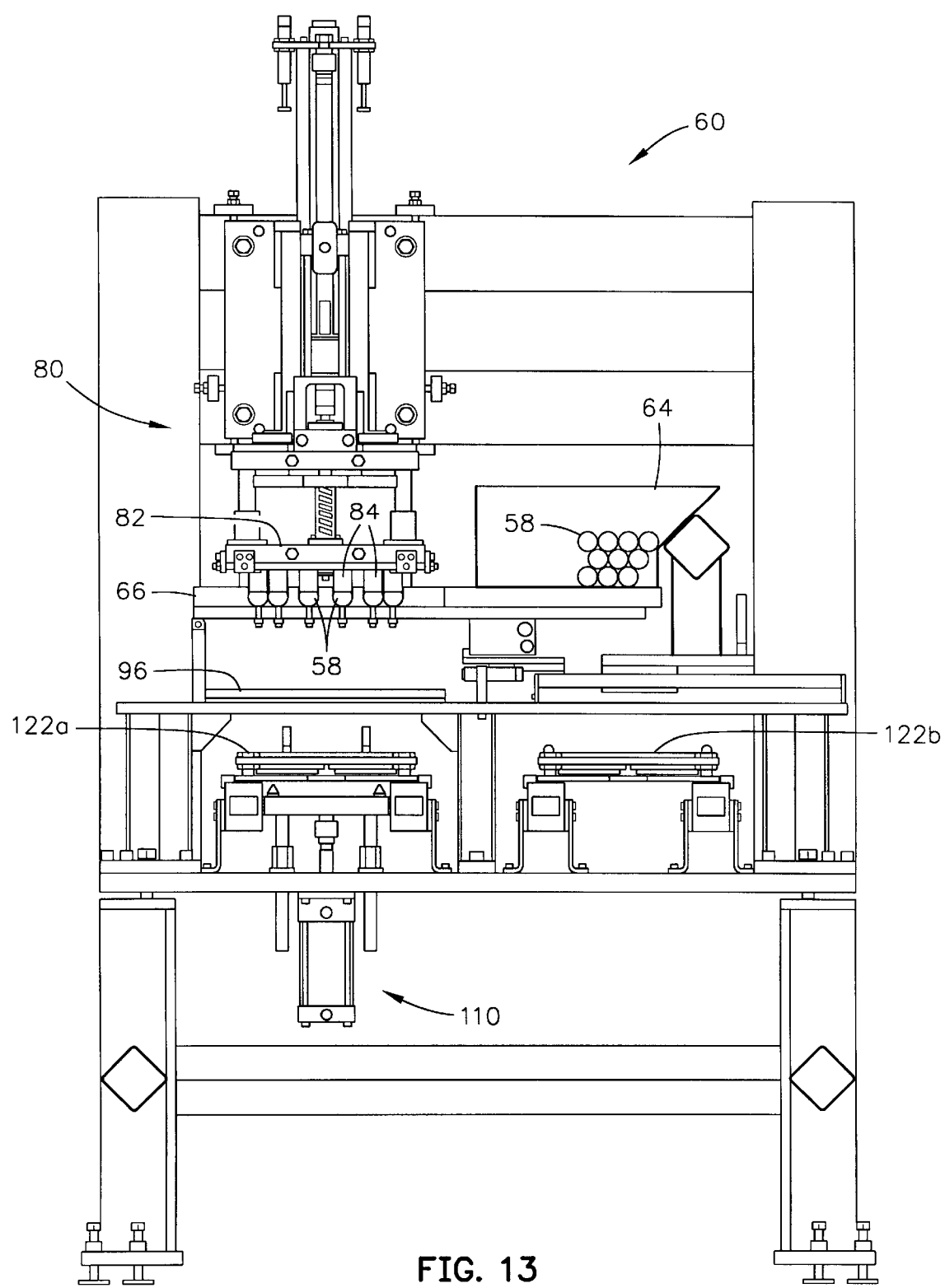
FIG. 13 is a front view of the system of the present invention at a first point of time during the process.

The operation of the insertion system and process is illustrated in FIGS. 13–17. As shown in FIG. 13, the locating plate 82 is lowered to a removal position so that each of the vacuum cups 84 may engage corresponding golf ball precursor products 58 that are held within the recesses 68 of the platen 66 in a predetermined pattern that corresponds to the position of the vacuum cups 84 on the locating plate 82, and also the pattern of the cavities 132 on the mold half 122a. During engagement, the vacuum cups exert a vacuum on each of the golf ball precursor products 58. Simultaneously, pressurized air is flowed into each of the recesses 68 to elevate the golf ball precursor products 58.

Figure 14:
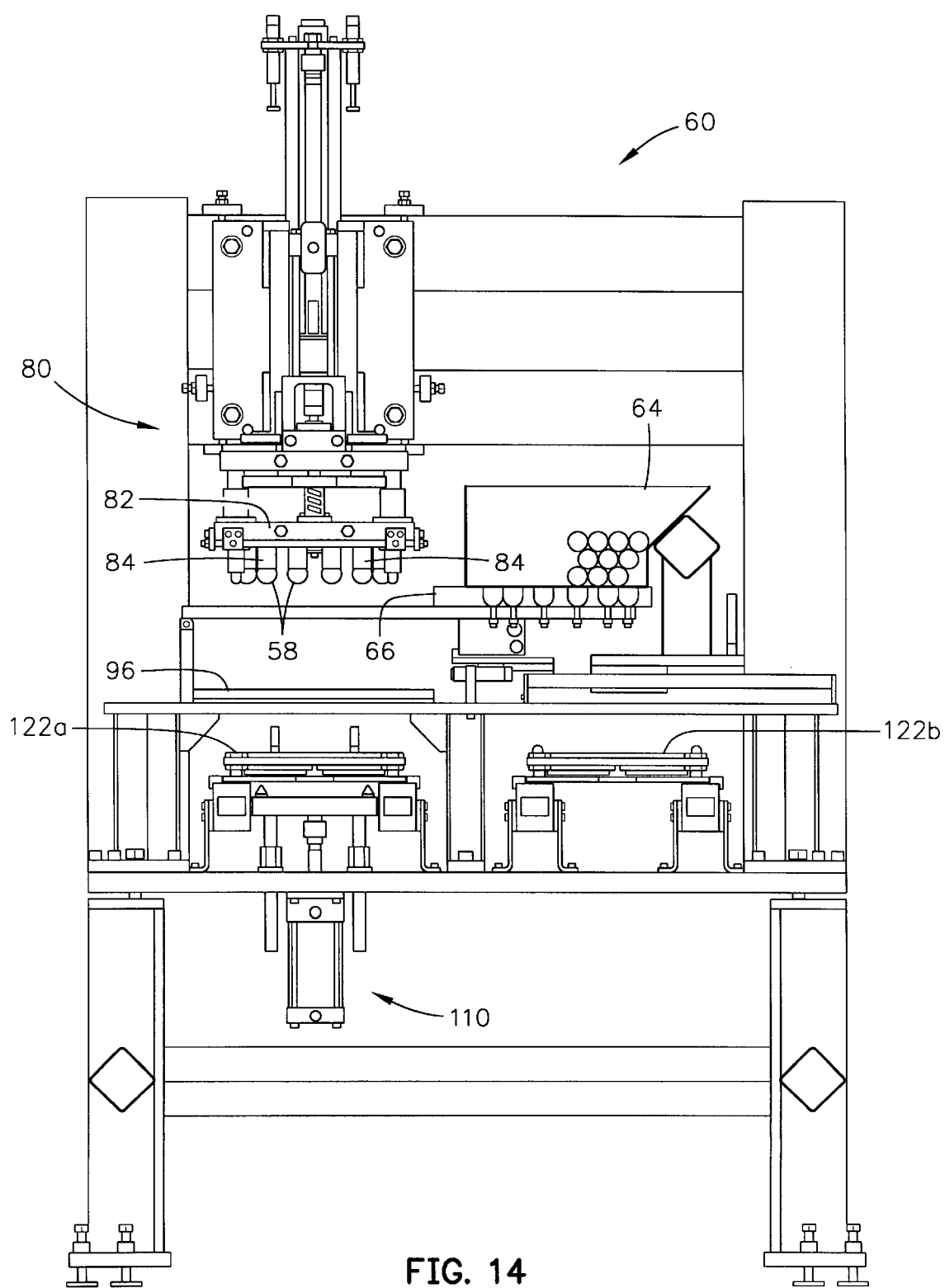
FIG. 14 is a front view of the system of the present invention at a second point of time during the process.

As shown in FIG. 14, the platen 66 has returned to the hopper position for receiving a new set of golf ball precursor products 58 from the source 64. Each of the first set of golf ball precursor products 58 is retained in a corresponding vacuum cup 84. The locating plate has been raised by the servo-motor 86 to a upper limit position to allow for the unobstructed clearance of the platen 66.

Figure 15:
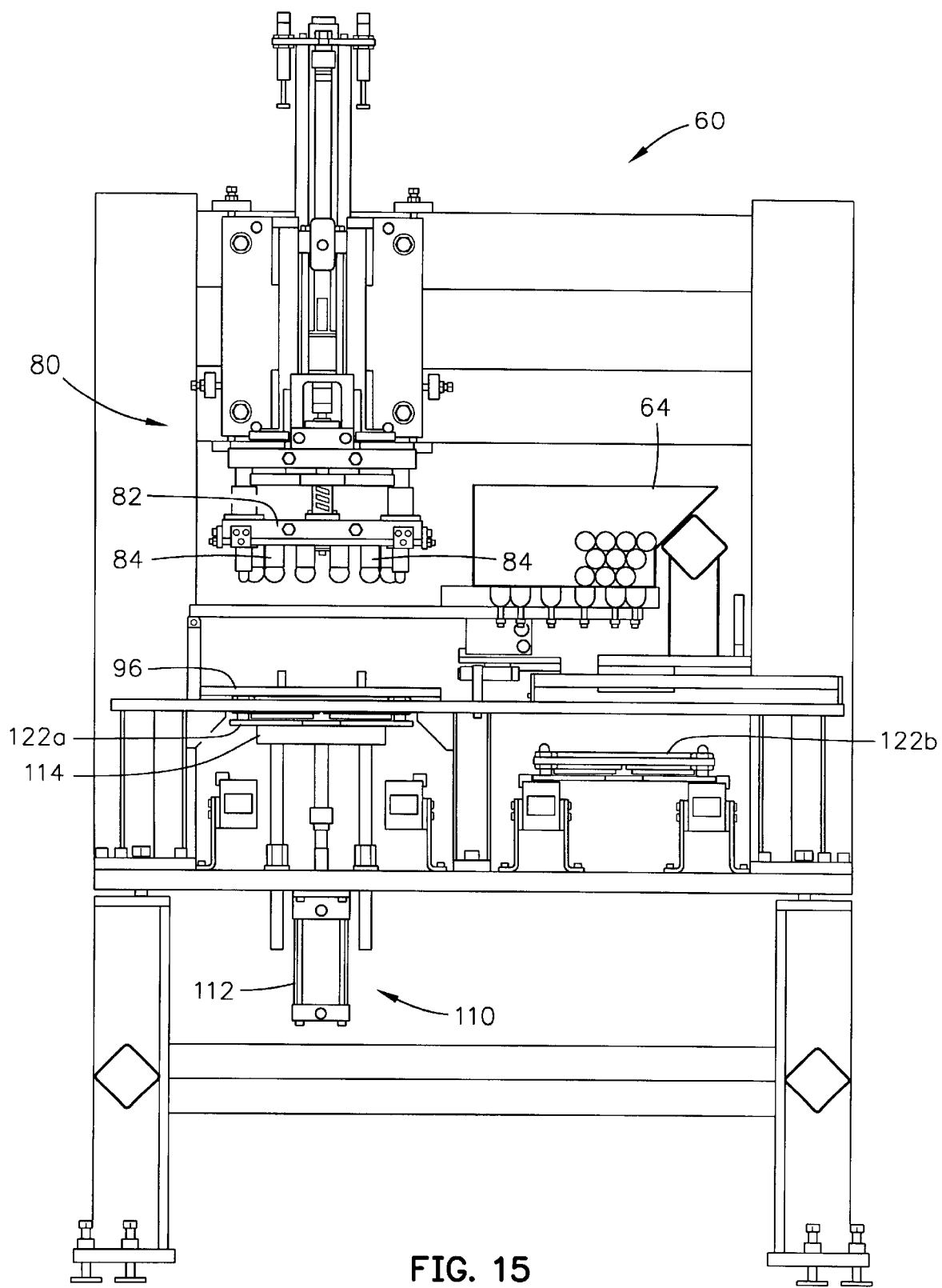
FIG. 15 is a front view of the system of the present invention at a third point of time during the process.

As shown in FIG. 15, the lifter mechanism 110 lifts the first mold half 122a to the insertion position and for engagement with the spacer plate 96. In a preferred embodiment, the cavities 132 are disposed below the central aperture 98 at the insertion position. However, an alternative would have the cavities 132 extend through the central aperture 98 at the insertion position. The locating plate 82 remains in the upper limit position.

Figure 16:
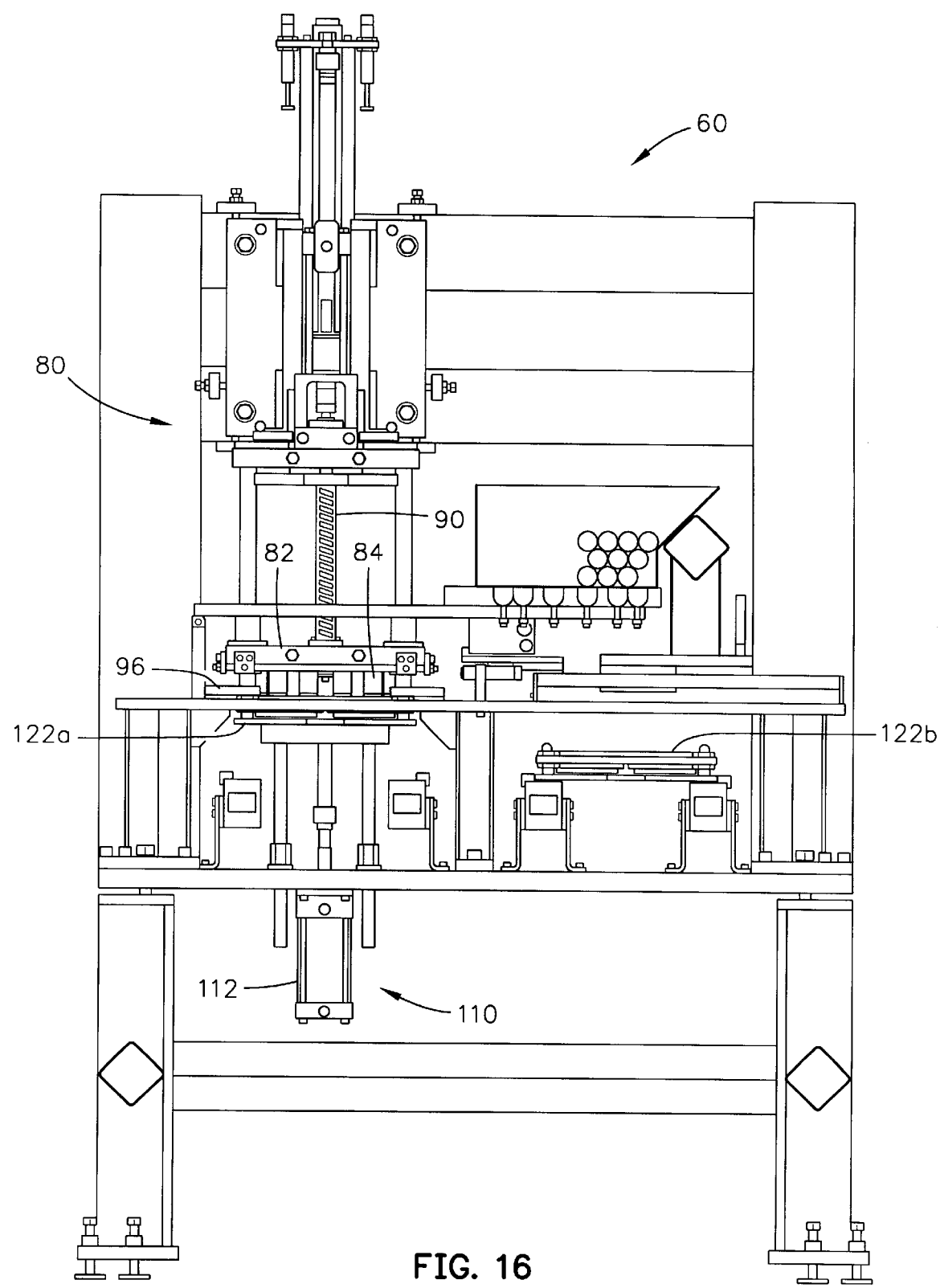
FIG. 16 is a front view of the system of the present invention at a fourth point of time during the process.

As shown in FIG. 16, the locating plate 82 is lowered to the insertion position. At the insertion position, the locating plate stops its downward movement along the longitudinal pathway 74. Then, the vacuum cups 84 are moved from a retracted position to an extended position for placement of the golf ball precursor products 58 into corresponding cavities 132 of the first mold half 122a. The vacuum cups 84 remain in the extended position for a predetermined amount of time, varying from 1 second to 20 seconds, and preferably 10 seconds. During this time period, the golf ball precursor products 58 are retained in each of the corresponding vacuum cups 84 through a vacuum in order to allow the thermoset material to gel to state of firmness. The thermoset material must be firm enough to prevent any further movement of the golf ball precursor product 58 once the vacuum is released from each of the vacuum cups 84. The vacuum cups 84 are designed to center the golf ball precursor product 58 with precision to the 0.005 inch. Thus, the thermoset material must be gelled sufficiently to prevent the gravitational force of the golf ball precursor product 58.

Figure 17:
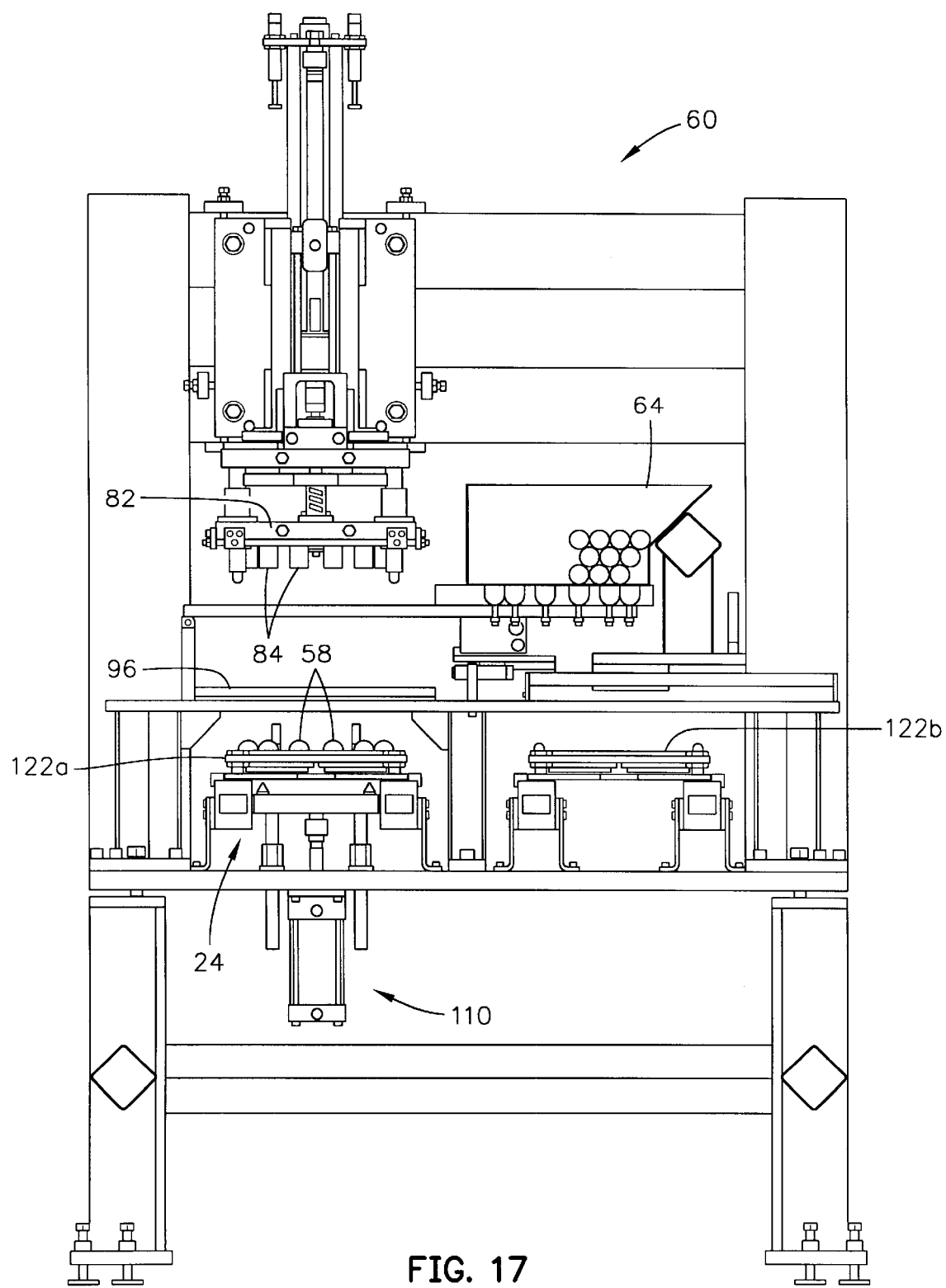
FIG. 17 is a front view of the system of the present invention at a fifth point of time during the process.

As shown in FIG. 17, the locating plate 82 is raised to the upper position, and the first mold half 122a, with the golf ball precursor products 58 in corresponding cavities 132, is lowered to the line of conveyance 24 for transferring to the mold assembly station 30. At the mold assembly station 30, the first mold half 122a is inverted and mated with the second mold half 122b that is transferred on the second conveyance line 25. The entire insertion process is preferably completed within sixty seconds.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention:

1. A method for simultaneously casting a thermoset layer on each of a plurality of golf ball precursor products, the method comprising:

providing a first mold half having a plurality of mold cavities, a second mold half having a plurality of mold cavities, a dispensing station, an insertion station, a holding platen, a hopper and a mold assembly station;

introducing a flowable material into each of a plurality of cavities disposed on the first mold half and the second mold half, at the dispensing station; the flowable material comprising a thermoset polymer material, precursor thermoset polymer materials, or a mixture thereof;

transferring the first mold half from the dispensing station to the insertion station and the second mold half to the mold assembly station, wherein the first mold half at the insertion station is in a conveyor position;

suctioning each of the plurality of golf ball precursor products from a holding platen using a vacuum cup for each, the holding platen movable from a hopper position to a suctioning position, each vacuum cup connected to a locating plate;

lifting the first mold half in a vertical plane from the conveyor position to an insert position, the locating plate lying in the vertical plane;

lowering the locating plate with each of the plurality of golf ball precursor products retained in corresponding vacuum cups toward the first mold half at the insert position;

extending the vacuum cups from a retracted position to an extended position toward the plurality of cavities located in the first mold half;

inserting each of the plurality of golf ball precursor products into a corresponding cavity of the plurality of cavities of the first mold half, wherein the extended vacuum cup centers the golf ball precursor products within the cavities to 0.005 inch precision;

releasing each of the plurality of golf ball precursor products from each of the vacuum cups after one to twenty seconds wherein the flowable material in the plurality of cavities of the first mold half is firm enough to prevent further movement of the golf ball precursor product;

lowering the first mold half with the plurality of golf ball precursor products therein from the insert position to the conveyor position;

transferring the first mold half to the mold assembly station; and mating the first mold half with the second mold half to form a mold assembly to enclose each of the plurality of golf ball precursor products within a spherical cavity to form a thermoset layer on each of the plurality of golf ball precursor products, wherein the entire insertion process is completed within sixty seconds.

2. The method according to claim 1 further comprising heating the mold assembly to cure the thermoset layer on each of the golf ball precursor products.

3. The method according to claim 1 wherein the plurality of golf ball precursor products suctioned from the holding platen is ten, and the plurality of cavities of the first mold half is ten.

4. The method according to claim 1 further comprising elevating each of the golf ball precursor products above the holding platen through flowing of air into each of a plurality of platen cavities that hold each of the golf ball precursor products.

5. The method according to claim 1 wherein each of the plurality of golf ball precursor products is selected from the group consisting of a core and a core with a boundary layer thereon.

6. The method according to claim 1 wherein the insert position is defined by a spacer plate having an aperture therein for allowing the insertion of each of the plurality of golf ball precursor products therethrough and into each of the plurality of cavities of the first mold half.

7. The method according to claim 1 wherein the flowable material is a thermoset polyurethane material and precursors therefor.

8. The method according to claim 1 wherein the first mold half is inverted prior to mating with the second mold half.

* * * * *